Dec. 28, 1965  P. J. PATERSON ETAL  3,226,059
TETHERED AIRBORNE OBSERVATION DEVICE
Filed April 27, 1964  2 Sheets-Sheet 1

INVENTORS
JOHN N. LEAVITT
PATRICK J. PATERSON
RAIGO ALAS
BY *Smart & Biggar.*
ATTORNEYS.

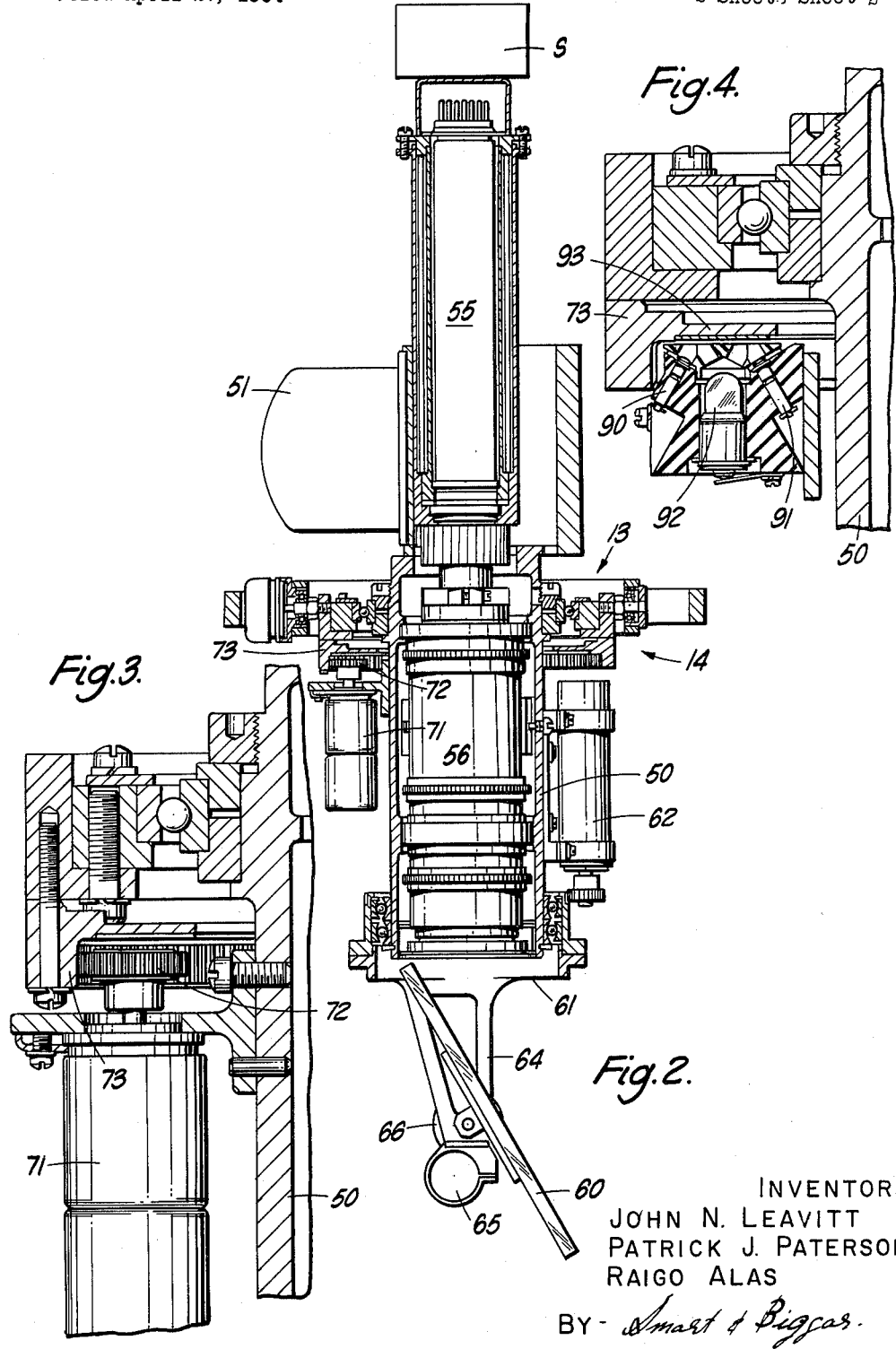

# United States Patent Office 3,226,059
Patented Dec. 28, 1965

3,226,059
TETHERED AIRBORNE OBSERVATION DEVICE
Patrick James Paterson, 1075 Pere Marquette, Quebec, Quebec, Canada, Raigo Alas, 2435 Chemin Ste. Foy, Apt. 2, Quebec, Quebec, Canada; and John Noxon Leavitt, West Flamboro Post Office, Ontario, Canada
Filed Apr. 27, 1964, Ser. No. 362,571
13 Claims. (Cl. 244—17.17)

This invention relates to airborne observation devices and particularly to observation devices supported by tethered rotating wing airframes.

In the past it has been proposed to mount a camera on helicopters and to control the position and attitude of the helicopter so that the line of sight of the camera, usually a television camera, is accurately positioned in space.

This prior proposal suffers from the disadvantage that it is virtually impossible to angularly stabilise a rotating wing airframe sufficiently to meet the image clarity and resolution requirements of a camera mounted thereon.

Applicants have overcome these disadvantages by isolating the camera from the airframe and stabilising the camera itself whilst permitting the airframe to move in angular attitude relatively thereto.

By providing a large excess of lift over weight and maintaining the lift vector substantially vertical, the device is maintained in a position approximately over the tether point.

According to the present invention, an airborne observation device comprises a rotary wing airframe; anchoring means for in-flight tethering of the airframe; a gyroscopically stabilised platform; a camera system on the platform; means for pendulously mounting the platform in the airframe with three degrees of movement relative thereto; and means for sensing changes in, and for correcting, airframe attitude relative to the stabilised platform.

By isolating the platform in a gimbal suspension which is only floatingly connected to the airframe, applicant is able to utilize the stabilized platform as a vertical and azimuthal reference to which the airframe's attitude may be referred for correction.

Preferably the camera is a television camera and the camera system includes means for transmitting the video signal back to the ground, conveniently through a cable of the anchoring means.

According to a preferred feature of the invention, the windings of at least one of the electric motors is tapped at a plurality of points to obtain a plurality of secondary electrical supplies at the required voltages for the electrical equipment on the airframe and platform.

According to the feature of the invention, the camera system includes a vidicon tube mounted on the vertical axis of the platform, lens means beneath the tube, and a mirror mounted beneath the lens means and adapted to be rotated about said vertical axis and about a horizontal axis.

According to a further feature of the invention, the airframe includes a skeletal structure, a pair of coaxial contra-rotating rigid fixed pitch rotors thereon, an electric motor for driving each rotor mounted on the structure and spring members for floatingly supporting the platform in the airframe.

According to a preferred construction of the invention, the anchoring means provides a tethering cable having ground connections and a bail member which receives the cable and is mounted on the skeletal frame for pivotal movement in the pitch plane of the airframe. The cable provides electrical connections between the ground and the airframe and platform.

It is a preferred feature of the invention that the platform be mounted in the airframe in a gimbal system which permits movement in the pitch, roll and yaw planes, the airframe attitude relative to the platform being sensed by potentiometers on the roll and pitch gimbals, and being corrected relative to the platform by driving the airframe against the tension of the anchoring cable by servo motors whereby to correct the attitude in the pitch and roll planes. A sensor element on the yaw gimbal provides a yaw error signal to operate means for driving the rotors at different speeds.

In still a further embodiment of the present invention, each motor is driven from a separate variable frequency generator and a yaw attitude error causes the generators to operate the motors at different speeds to correct the yaw attitude.

It is another preferred feature of the invention that an earth's magnetic field sensor and servo drive be mounted on the stabilised platform to slave it against its mountings whereby to provide a fixed space orientation for the camera.

The platform is, according to the invention, stabilised by three rate gyroscopes on the platform oriented with their spin vectors lying 120° apart so that the net angular momentum in static equilibrim is zero.

One embodiment of the present invention will now be described with reference to the accompanying drawings in which:

FIGURE 2 is a sectional elevation of the platform showing the camera mountings;

FIGURE 3 is a sectional detail; and

FIGURE 4 is a section detail taken at the same level as FIGURE 3 relative to the gimbal system but at another point spaced around the circumference thereof.

Figure 1:
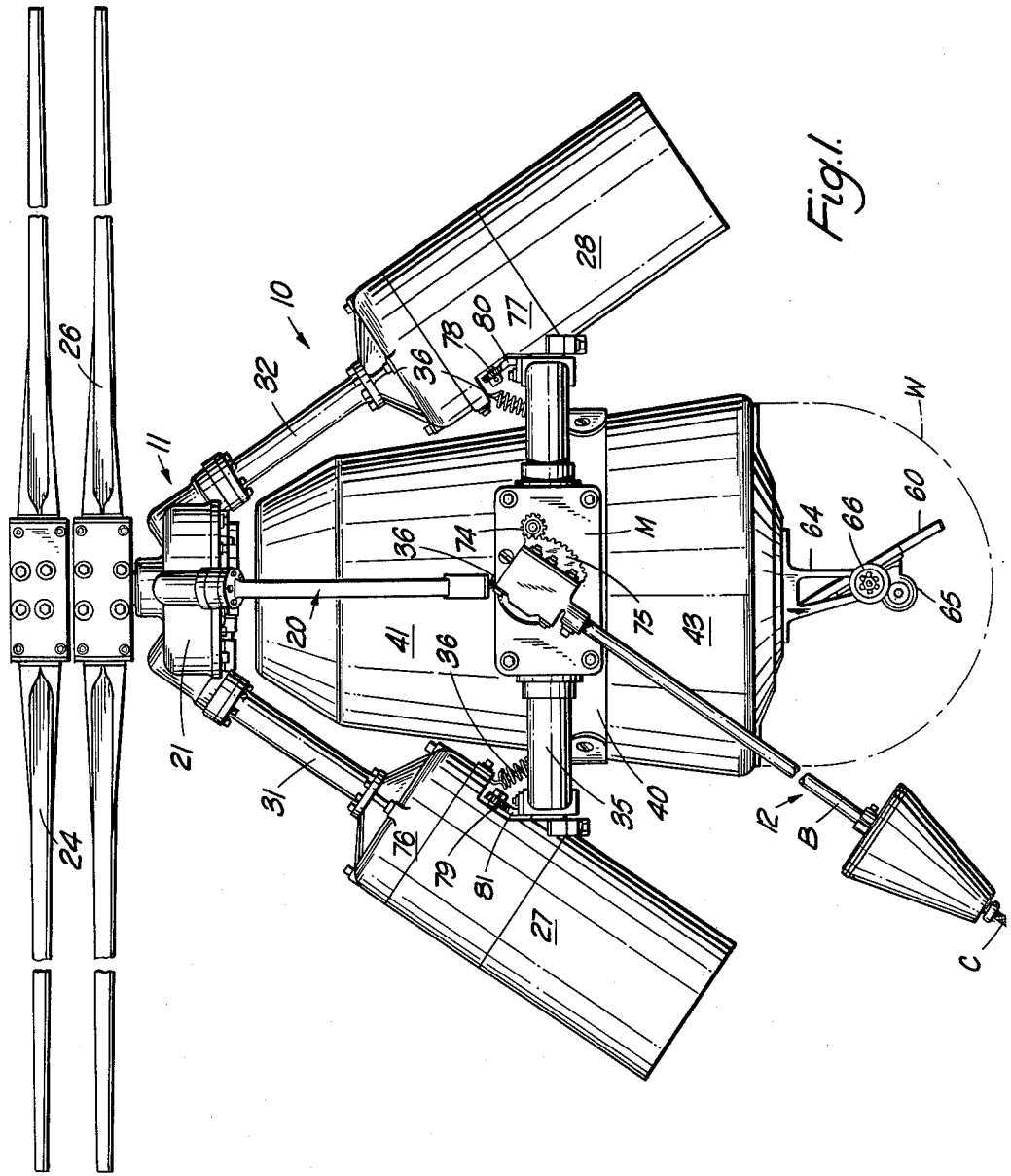
FIGURE 1 is an elevation of the airframe of the device.

Referring now to the drawings, the airborne observation device 10 broadly comprises a rotating-wing airframe 11, a ground anchoring means 12 which includes a tethering cable and a camera-bearing gyroscopically stabilised platform 13, mounted in a gimbal system 14 in the airframe 11, on the device.

The airframe includes a skeletal structure 20 having at the top thereof a gear box 21 through which a pair of contra-rotating rigid fixed pitch rotors 24, 26 are individually driven by induction motors 27, 28 respectively through their torque tubes 31, 32 at speeds sufficient to provide a lifting force amply exceeding that required to maintain the device airborne, thereby maintaining a high degree of tension in the tethering cable and reducing any tendency of the device to positionally drift during flight. The motors are connected together by a pivoting tubular ring 35 to which the anchoring means 12 is pivotally mounted.

Supporting and vibration isolating springs 36 connect the skeletal structure with the centre ring 40 of a shroud 41 in which the gimbal system 14 and the platform 13 is centrally located. The motor location and skeletal configuration is such that the centre of gravity of the device is approimately coincident with the point of suspension of the stabilized platform 13. The shroud 41 provides an aero-dynamically streamlined cover for the platform 13 and protects the platform and the parts thereon from the wash of the rotors 24, 26. Conveniently, the shroud 41 in addition to a top portion and the central ring 40, has a lower frusto-conical bottom skirt 43 surrounding the lower part of the platform and providing a suitable storage space for electronic components (not shown). A transparent windshield W encloses the mirror 60 and is attached to the skirt 43.

The platform 13 (FIGURE 2) comprises a housing 50 to which are connected three rate gyroscopes orientated with their spin vectors lying 120° apart in a horizontal plane, so that the net angular momentum in static equilibrium is zero. The precession axes makes an angle of $\tan^{-1} \sqrt{2}$ or 54.7° with the horizontal plane. In reaction to small torque impulses applied about any axis, the group of three gyros in this configuration behave as a large, almost pure moment of inertia of magnitude $I^2W^2/S$ where IW is the angular momentum of each rotor and S is the spring constant of the restraining spring contained within the gyroscope 51. The housing 50 with the gyroscope 51 is mounted slightly pendulously in the gimbal system 14 thereby forming a pendulum with period considerably longer than the natural period of the disturbances on the platform.

In the housing 50 there is provided a television camera system comprising a vidicon tube 55, a zoom lens system 56 and a high precision mirror 60 mounted on a turret 61 beneath the housing for rotation thereabout. The turret is driven in azimuth by a servo motor 62 and the mirror is pivotally mounted in bearings bracket 64 at the bottom of the turret driven and tiltably by a servo motor 65 through friction means 66. The zoom lens is operated in the normal fashion by motors not shown.

Mounted at the top of the platform 13 is an earth's magnetic field sensor or compass S, which, through a conventional servo loop including an amplifier and servo motor 71 mounted on the housing 50, slaves the housing against its yaw gimbal. The motor 71 drives the pinion 72 which meshes with the ring gear 73 so that the platform is space orientated about its vertical axis in a north-seeking direction.

The fact that the stabilised platform 13 is mounted in concentric gimbal rings of the gimbal system 14, which permits the airframe 11 three degrees of movement relative to the stabilised platform in the pitch, roll and yaw planes permits the stabilised platform 13 to act as a vertical reference to which the movement of the airframe may be related for the purpose of correction of the airframe attitude in flight.

The correction of airframe attitude in pitch is accomplished by means of diametrically oppositely located torquing motors and associated gearing mounted on the tubular ring 35 (only one motor being shown in FIGURE 1). The motors which are constantly running, operate through variable torque clutches to drive pinion gears 74 against rack sectors 75. The sectors 75 are secured to the pivot bearings which receive the ends of a U-configuration bail member B one arm only of which is seen in FIGURE 1. The motors when operated, torque against the tension transmitted to the sectors 75 by the bail member from the anchoring cable C and tend to erect the airframe to the vertical. Similarly, correction of airframe attitude in roll is achieved by means of torquing motors mounted in the upper section 76, 77 of the motor casings, which motors, through variable torque clutches, drive gears 78, 79, against gear sectors 80 and 81 secured to the tubular ring 35 and spaced 90° thereon from the sectors 75.

Erecting command signals to excite the variable torque clutches to correct the airframe attitude in pitch and roll are obtained in conventional fashion from potentiometers on the gimbal system 14 which act as detectors and sense movement of the airframe relative to the stabilised platform in pitch and roll and operate the clutches through conventional servo drive means.

The motors 27, 28 are each electrically connected through the cable C each to its own variable frequency generators which are conveniently mounted on a mother vehicle (not shown) and driven by a prime mover thereon through a controller differential drive.

As best seen in FIGURE 4, movement of the airframe 11 about the yaw axis of the stabilised platform 13 is detected by photoelectric cells 90, 91. Light from a lamp 92 is reflected from a mirrored spiral surface on a black background on the underside of the member 93 which extends from the rack sector 73 and movement of the airframe realtive to the yaw gimbal causes the photoelectric cells 90 and 91 to detect the movement, and its sense, and by conventional means to transmit an error signal through the cable C to the vehicle as a yaw angular attitude error.

The two generators are driven through differential drives so that the sum of the speeds of the two is approximately constant and the speed difference is proportional to a yaw angular attitude error. Thus in conventional fashion the error signal transmitted from the cable C, causes the generators to operate the motors at different speed and therefore to drive the rotors 24, 26 at different speeds whereby to tend to correct the yaw attitude. Some yaw movement may be tolerated since it does not disturb the airframe's vertical flying attitude, however yaw movement may cause compass bearing errors as a result of magnetic field distortion of the environment of the compass. It is preferable to use fly-leads rather than slip-rings for electrically connecting the platform 13 with the airframe for reasons of minimizing electrical noise. Therefore yaw movement needs to be controlled within the limitations imposed by these factors.

To reduct weight of the cable C the power to the motors is transmitted at high voltages whilst relatively low voltages are required for operation of the gyroscope 51 the torquing motors and electronic equipment. The appropriate voltages are obtained with negligible weight penalty, by tapping the motor windings at appropriate points.

In the preferred embodiment the motors 27, 28 are 3-phase star connected motors. The multiple voltages required are obtained by two taps on each motor winding used in conjunction with the star connection which forms a neutral for the entire system at the device. Alternating current voltages are obtained using various combinations of the taps and center connection as both single phase sources for motor drives and 3-phase sources for retification for D.C. supplies. The 3-phase source for rectification minimizes the weight of smoothing components, capacitors, etc., for pulsating D.C.

In order to reduce the wind resistance offered by the cable, applicants have perceived that by tolerating large electrical power losses in the cable, the diameter may be reduced to a size dependent upon the tensile loading and maximum insulation temperature of the cable.

The preferred embodiment of this concept is a cable consisting of a centrally located miniature coaxial cable (for transmitting the multiplexed video and command signals) surrounded by twelve individually insulated power conductors, the diameter of which is chosen such that each is in contact with the adjacent conductors and the co-axial cable. The conductors are slightly spiraled about the coaxial cable. The power transmitter through several hundred feet of this cable is 12K watts, the outside diameter of the cable being approximately ⅛".

The bail and the cable receiving cone at the end thereof act as an "undercarriage" for the device. On the mother vehicle, there is provided a horn through which the cable is drawn to pull the cone into the horn and retain it rigidly when not in operation.

What we claim as our invention is:

1. An airborne observation device comprising a rotary wing airframe; anchoring means for in-flight tethering of the airframe; a gyroscopically stabilised platform; a camera system on said platform; means for pendulously mounting said platform in the airframe with three degrees of movement relative thereto; and means for sensing changes in, and for correcting, airframe attitude relative to the stabilised platform.

2. A device as claimed in claim 1 in which the camera is a television camera and in which the camera system includes means for transmitting the video signal back to the ground.

3. A device as claimed in claim 2 wherein the camera system includes a vidicon tube mounted along the vertical axis of the platform; a lens means beneath the tube; and a mirror mounted beneath the lens means and adapted to be rotated about said vertical axis and about a horizontal axis.

4. A device as claimed in claim 1 in which the rotary wing airframe includes a skeletal structure; a pair of coaxial contra-rotating rigid fixed pitch rotors thereon; an electric motor for driving each rotor mounted on said structure; and spring members for floatingly supporting the platform in the airframe.

5. A device as claimed in claim 4 in which the anchoring means comprises a tethering cable; ground connections for said cable; a bail member adapted to receive the cable and being mounted on the skeletal frame for pivotal movement in the pitch and roll plane of the airframe; the cable providing electrical connections between the ground and the airframe and platform.

6. A device as claimed in claim 4 in which the windings of at least one of the electric motors is tapped at a plurality of points to obtain a plurality of secondary electrical supplies for the airframe and platform.

7. A device as claimed in claim 5 in which the means for mounting the platform in the airframe is a gimbal system permitting movement in the pitch, roll and yaw planes and in which the means for sensing changes in, and for correcting, airframe attitude relative to the platform include sensing potentiometers in the roll and pitch gimbals and servo motors responsive to erecting signals from the sensing potentiometers to drive the airframe, against the tension of the cable, in the pitch and roll planes to correct its attitude towards the vertical.

8. A device as claimed in claim 4 in which the means for mounting the platform in the airframe is a gimbal system permitting rotation in the yaw plane and in which the means for sensing changes in, and for correcting airframe attitude, includes a sensor element on the yaw gimbal and means responsive to an error signal from the sensor element for driving the rotors at different speeds in response to the yaw attitude of the airframe.

9. A device as claimed in claim 8 in which the anchoring means for in-flight tethering of the airframe comprises a cable, and in which the electric motors are driven from the ground by a pair of variable frequency generators, one for each motor, and in which a yaw error signal is transmitted through the cable to cause the generators to operate each motor at different speeds whereby to cause the yaw attitude correction.

10. A device as claimed in claim 1 wherein an earth's magnetic sensor and servo drive is mounted on the platform to slave the platform against its mounting whereby to provide a fixed azimuthal orientation for the platform.

11. A device as claimed in claim 1 in which the platform is stabilised by three rate gyroscopes on the platform oriented with their spin vectors lying 120° apart whereby the net angular momentum in static equilibrium is zero.

12. A device as claimed in claim 5 in which the bail has a cone member centrally located thereon, which cone member and bail serve to act as an undercarriage for the device.

13. A device as claimed in claim 5 in which the cable is a small diameter cable including a centrally located coaxial cable, a plurality of conductors arranged around the coaxial cable, adjacent conductors touching each other and all conductors touching the coaxial cable.

References Cited by the Examiner

UNITED STATES PATENTS

| | | | |
|---|---|---|---|
| 2,100,934 | 11/1937 | Berges | 244—77 |
| 2,933,267 | 4/1960 | Slater et al. | 244—77 X |
| 3,040,123 | 6/1962 | Hellings | 178—6 |

FOREIGN PATENTS

| | | |
|---|---|---|
| 897,756 | 5/1962 | Great Britain. |

MILTON BUCHLER, *Primary Examiner.*

FERGUS S. MIDDLETON, *Examiner.*